(12) United States Patent
Cook et al.

(10) Patent No.: US 6,707,853 B1
(45) Date of Patent: Mar. 16, 2004

(54) INTERFACE FOR PERFORMING MOTION COMPENSATION

(75) Inventors: Val G. Cook, Shingle Springs, CA (US); Scott R. Janus, Davis, CA (US); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/481,374

(22) Filed: Jan. 10, 2000

(51) Int. Cl.[7] ................... H04N 7/12; H04N 11/02; H04N 11/04
(52) U.S. Cl. .............. 375/240.16; 375/240.12; 375/240.13; 375/240.14; 375/240.15; 375/240.16
(58) Field of Search ............. 375/240.12, 240.13, 375/240.14, 240.15, 240.16, 240.17, 240.24, 240.25

(56) References Cited

U.S. PATENT DOCUMENTS

| 6,178,203 | B1 | * | 1/2001 | Lempel ............... 375/240.24 |
| 6,215,822 | B1 | * | 4/2001 | Bose et al. .......... 375/240.16 |
| 6,243,497 | B1 | * | 6/2001 | Chiang et al. ........... 382/251 |
| 6,266,091 | B1 | * | 7/2001 | Saha et al. .......... 375/240.16 |
| 6,332,002 | B1 | * | 12/2001 | Lim et al. ........... 375/240.17 |
| 6,385,248 | B1 | * | 5/2002 | Pearlstein et al. .... 375/240.25 |
| 6,414,996 | B1 | * | 7/2002 | Owen et al. ......... 375/240.17 |
| 6,452,973 | B1 | * | 9/2002 | Hwang ............... 375/240.27 |
| 6,501,799 | B1 | * | 12/2002 | Kohn ................. 375/240.16 |
| 6,519,005 | B2 | * | 2/2003 | Bakhmutsky et al. .... 348/415.1 |

* cited by examiner

Primary Examiner—Chris Kelley
Assistant Examiner—Charles E Parsons
(74) Attorney, Agent, or Firm—Blakely, Sokoloff, Taylor & Zafman LLP

(57) ABSTRACT

According to one embodiment, a circuit for generating motion compensated video includes a means for translating a macroblock into one or more motion compensation commands having associated correction data related to the macroblock. The motion compensation command is an autonomous command that supports a plurality of motion compensation modes. Also, the circuit includes a means for receiving the motion compensation command, a means for storing the correction data in a memory according to a first order corresponding to the motion compensation command and a means for performing frame prediction operations in response to the motion compensation command. Moreover, the circuit includes a means for reading the correction data from the memory according to a second order and a means for combining the correction data with results from the frame prediction operations to generate an output video frame.

26 Claims, 8 Drawing Sheets

| Time | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Delivery Time | $I_1$ | $P_4$ | $B_2$ | $B_3$ | $P_7$ | $B_5$ | $B_6$ | $I_{10}$ | $B_8$ | $B_9$ | $P_{13}$ | $B_{11}$ | $B_{12}$ | $I_{14}$ | $P_{17}$ | $B_{15}$ | $B_{16}$ | | |
| Display Time | | | $I_1$ | $B_2$ | $B_3$ | $P_4$ | $B_5$ | $B_6$ | $P_7$ | $B_8$ | $B_9$ | $I_{10}$ | $B_{11}$ | $B_{12}$ | $P_{13}$ | $I_{14}$ | $B_{15}$ | $B_{16}$ | $P_{17}$ |

*FIG. 3*

INTERFACE FOR PERFORMING MOTION COMPENSATION

FIELD OF THE INVENTION

The invention relates to graphics display by electronic devices. More particularly, the invention relates to motion compensation of graphics that are displayed by electronic devices.

BACKGROUND OF THE INVENTION

Several standards currently exist for communication of digital audio and/or video data. For example, the Motion Picture Experts Group (MPEG) has developed several standards for use with audio-video data (e.g., MPEG-1, MPEG-2, MPEG-4, etc.). In order to improve data communications audio-video data standards often include compression schemes. In particular, MPEG-2 provides use of a motion vector as part of a digital video compression scheme.

In general, motion vectors are used to reduce the amount of data required to communicate full motion video by utilizing redundancy between video frames. The difference between frames can be communicated rather than the consecutive full frames having redundant data. Typically, motion vectors are determined for 16×16 pixel (pel) sets of data referred to as a "macroblock."

Digital encoding using motion compensation that uses a search window or other reference that is larger than a macroblock to generate a motion vector pointing to a macroblock that best matches the current macroblock. The search window is typically larger than the current macroblock. The resulting motion vector is encoded with data describing the macroblock. In addition, predictive coding may be used to reduce the statistical redundancy between video frames and within a particular frame. Predictive coding is a technique in which a next value is predicted based upon a current value, or in some cases, a future value.

Decoding of video data is typically accomplished with a combination of hardware and a software driver. Motion compensation is typically decoded with dedicated motion compensation circuitry that operates on a buffer of video data representing a macroblock. However, since there are a multitude of predictive coding techniques that the motion compensation circuitry must be able to decode, there is typically a high degree of circuit complexity necessary to implement the motion compensation circuitry. For example, motion compensation circuitry typically includes a register-based interface that must execute a plurality of commands and control words in order to provide decoding for all of the various predictive techniques. Therefore, what is needed is an interface to motion compensation circuitry that that provides a single command that supports all of the various predictive coding techniques.

SUMMARY OF THE INVENTION

According to one embodiment, a method of motion compensation of digital video data is disclosed. The method includes receiving a first macroblock corresponding with a first of a plurality of motion compensation modes and translating the first macroblock into one or more motion compensation commands having associated correction data related to the first macroblock. The motion compensation command is an autonomous command that supports all of the plurality of motion compensation modes. In addition, the method includes storing the correction data in a memory according to a first order corresponding to the motion compensation commands and performing frame prediction operations in response to the motion compensation command. Further, the method includes reading the correction data from the memory according to a second order and combining the correction data with results from the frame prediction operations to generate an output video frame.

BRIEF DESCRIPTION OF THE DRAWINGS

The invention is illustrated by way of example, and not by way of limitation in the figures of the accompanying drawings in which like reference numerals refer to similar elements.

FIG. 3 is a typical timeline of frame delivery and display of VIDEO frames;

DETAILED DESCRIPTION

A method and apparatus for an interface for motion compensation of video is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In general, the invention provides an interface for motion compensation by reconstructing a picture by predicting pixel colors from one or more reference pictures. The prediction can be forward, backward or bi-directional. The architecture described herein provides for reuse of texture mapping hardware components to accomplish motion compensation of digital video data. Bounding boxes and edge tests are modified such that complete macroblocks are processed for motion compensation. In addition, pixel data is written into a texture palette according to a first order based on Inverse Discrete Cosine Transform (IDCT) results and read out according to a second order optimized for locality of reference. A texture palette memory management scheme is provided to maintain current data and avoid overwriting of valid data when motion/compensation commands are pipelined.

Figure 1:
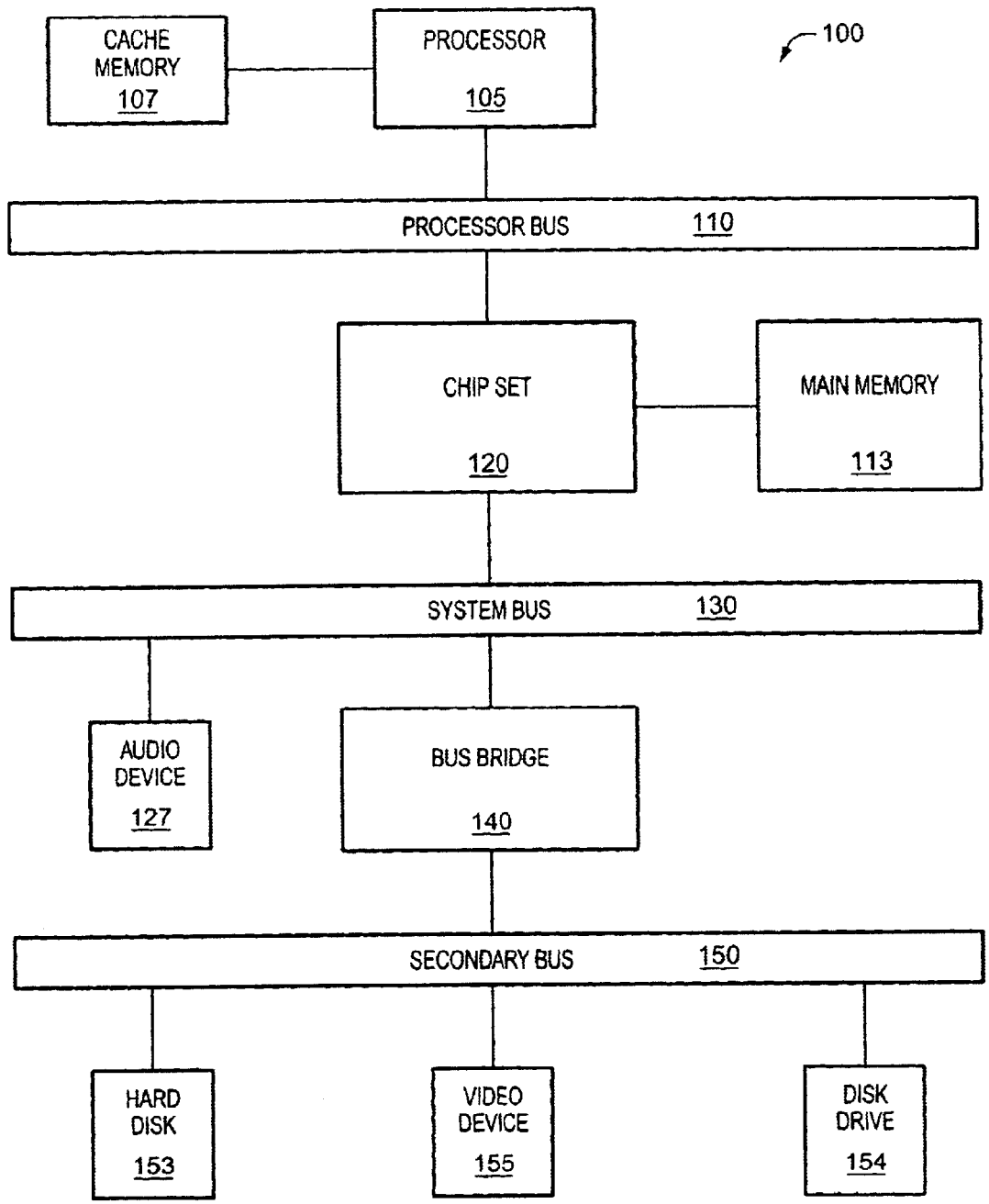
FIG. 1 is a block diagram of one embodiment of a computer system.

FIG. 1 is a block diagram of one embodiment of a computer system 100. Computer 100 includes a central processing unit (processor) 105 coupled to processor bus 110. In one embodiment, processor 105 is a processor in the Pentium® family of processors including the Pentium® II family and mobile Pentium® and Pentium® II processors available from Intel Corporation of Santa Clara, Calif. Alternatively, other processors may be used. Processor 105 may include a first level (L1) cache memory (not shown in FIG. 1).

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. Cache memory 107 is optional and is not required for computer system 100.

Chip set 120 is also coupled to processor bus 110. In one embodiment, chip set 120 is the Intel® 82810 (or 82810-DC100) chip set available from Intel Corporation; however, other chip sets can also be used. Chip set 120 may include a memory controller for controlling a main memory 113. Main memory 113 is coupled to processor bus 110 through chip set 120. Main memory 113 and cache memory 107 store sequences of instructions that are executed by processor 105. The sequences of instructions executed by processor 105 may be retrieved from main memory 113, cache memory 107, or any other storage device. Additional devices may also be coupled to processor bus 110, such as multiple processors and/or multiple main memory devices. Computer 100 is described in terms of a single processor; however, multiple processors can be coupled to processor bus 110.

Processor bus 110 is coupled to system bus 130 by chip set 120. In one embodiment, system bus 130 is a Peripheral Component Interconnect (PCI) standard bus adhering to Specification Revision 2.1 developed by the PCI Special Interest Group of Portland, Oregon; however, other bus standards may also be used. Multiple devices, such as audio device 127, may be coupled to system bus 130.

Bus bridge 140 couples system bus 130 to secondary bus 150. In one embodiment, secondary bus 150 is an Industry Standard Architecture (ISA) Specification Revision 1.0a bus developed by International Business Machines of Armonk, New York. However, other bus standards may also be used, for example Extended Industry Standard Architecture (EISA) Specification Revision 3.12 developed by Compaq Computer, et al.

Video device 155 is also coupled to secondary bus 150. In one embodiment, video device 155 includes a video monitor such as a cathode ray tube (CRT) or liquid crystal display (LCD) and necessary support circuitry. In other embodiments, video device 155 may be coupled to system bus 130 or directly to chip set 120. Moreover, other devices, such as hard disk 153 and disk drive 154 may also be coupled to secondary bus 150. Further devices, such as cursor control devices (not shown in FIG. 1), may be coupled to secondary bus 150.

According to one embodiment, computer 100 is used to perform motion compensation in a graphics texture mapping engine. Motion compensation may be performed by computer 100 in response to processor 105 executing sequences of instructions contained in main memory 113.

Instructions are provided to main memory 113 from a storage device, such as magnetic disk, a read-only memory (ROM) integrated circuit (IC), CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software instructions.

Figure 2:
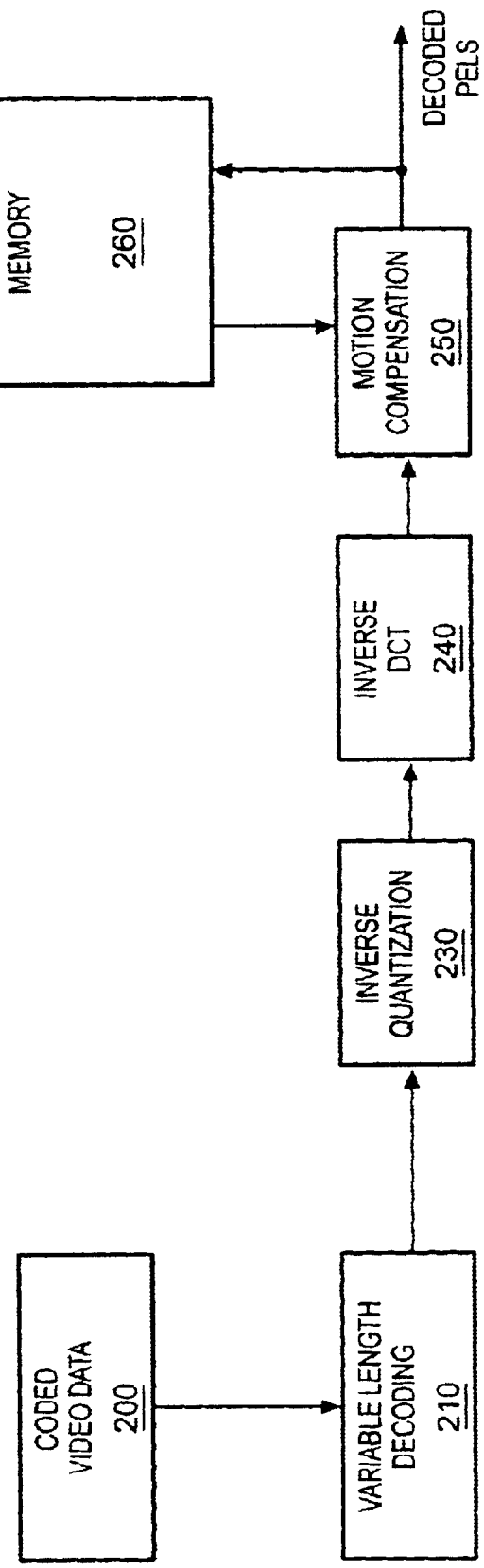
FIG. 2 is a block diagram of one embodiment of a decoding process.

FIG. 2 is a block diagram of one embodiment of a decoding process. Coded video data 200 is obtained. Coded video data 200 can come from either a local (e.g., memory, DVD, CD-ROM) or a remote (e.g., Web server, video conferencing system) source. In one embodiment, coded video data 200 is encoded using variable length codes. In such an embodiment, an input bit stream is decoded and converted into a two-dimensional array via variable length decoding 210. Variable length decoding 210 operates to identify instructions in the input stream having variable lengths because of, for example, varying amounts of data, varying instruction sized, etc.

The output of variable length decoding 210 provides input to inverse quantization 230, which generates a set of Discrete Cosine Transform (DCT) coefficients. The two-dimensional array of DCT coefficients is processed via inverse DCT (IDCT) 240, which generates a two-dimensional array of correction data values. The correction data values include motion vectors for video data. In one embodiment, the correction data values include luminance and chrominance.

Correction data values from IDCT 240 are input to motion compensation block 250, which results in decoded pels. The decoded pels and the correction data values are used to access pixel value data stored in memory 260. Memory 260 stores predicted pixels and reference pixels.

FIG. 3 is a typical timeline of frame delivery and display of VIDEO frames. Frames within a video stream can be decoded in a different order than display order. In addition frames can be delivered in a different order than shown in FIG. 3. Ordering of frame delivery can be chosen based on several factors as is well known in the art.

Video frames are categorized as Intra-coded (I), Predictive-coded (P), Bi-directionally predictive-coded (B). Intra-coded frames are frames that are not reconstructed from other frames. In other words, the complete frame is communicated rather than differences between previous and/or subsequent frames.

Bi-directionally predictive coded frames are interpolated from both a preceding and a subsequent frame based on differences between the frames. B frames can also be predicted from forward or backward reference frames. Predictive coded frames are interpolated from a forward reference picture. Use of I, P and B frames is known in the art and not described in further detail except as it pertains to the invention. The subscripts in FIG. 3 refer to the original ordering of frames as received by an encoder. Use of I, P and B frames with the invention is described in greater detail below.

Figure 4:
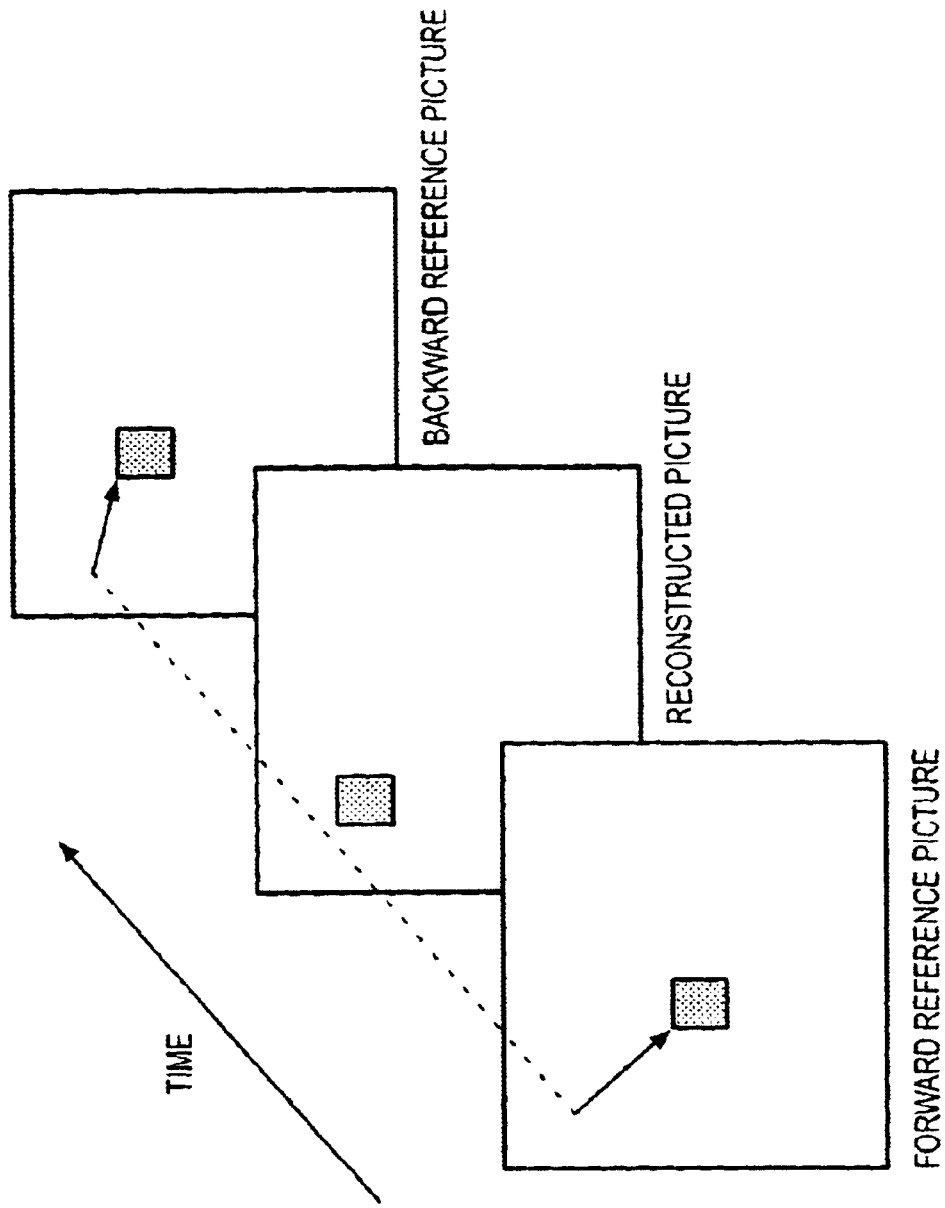
FIG. 4 illustrates three VIDEO frames.

FIG. 4 illustrates three VIDEO frames. The reconstructed picture is a currently displayed B or P frame. The forward reference picture is a frame that is backwards in time as compared to the reconstructed picture. The backward reference picture is a frame that is forward in time as compared to the reconstructed picture.

Frames are commonly reconstructed with a "Frame Picture Structure " or a "Field Picture Structure." A frame picture contains every scan line of the image, while a field picture contains only alternate scan lines. The "Top field " contains the even numbered scan lines and the "Bottom field " contains odd numbered scan lines. Frame picture structures and field picture structures as related to motion vectors are described in greater detail below. In one embodiment, the Top field and the Bottom field are stored in memory in an interleaved manner. Alternatively, the Top and Bottom fields can be stored independently of each other.

In general, motion compensation consists of reconstruction of a picture by predicting, either forward, backward or bi-directionally, the resulting pixel colors from one or more reference pictures. FIG. 4 illustrates two reference pictures and a bi-directionally predicted reconstructed picture. In one embodiment, the pictures are divided into 16 pixel by 16 pixel macroblocks; however, other macroblock sizes (e.g., 16×8, 8×8) can also be used. A macroblock is further divided into 8 pixel by 8 pixel blocks.

In one embodiment, motion vectors originate at the upper left corner of a current macroblock and point to an offset location where the most closely matching reference pixels are located. Motion vectors can originate from other locations within a macroblock and can be used for smaller portions of a macroblock. The pixels at the locations indicated by the motion vectors are used to predict the reconstructed picture.

In one embodiment, each pixel in the reconstructed picture is bilinearly filtered based on pixels in the reference picture(s). The filtered color from the reference picture(s) is interpolated to form a new color. A correction term based on the IDCT output can be added to further refine the prediction of the resulting pixels.

Figure 5:
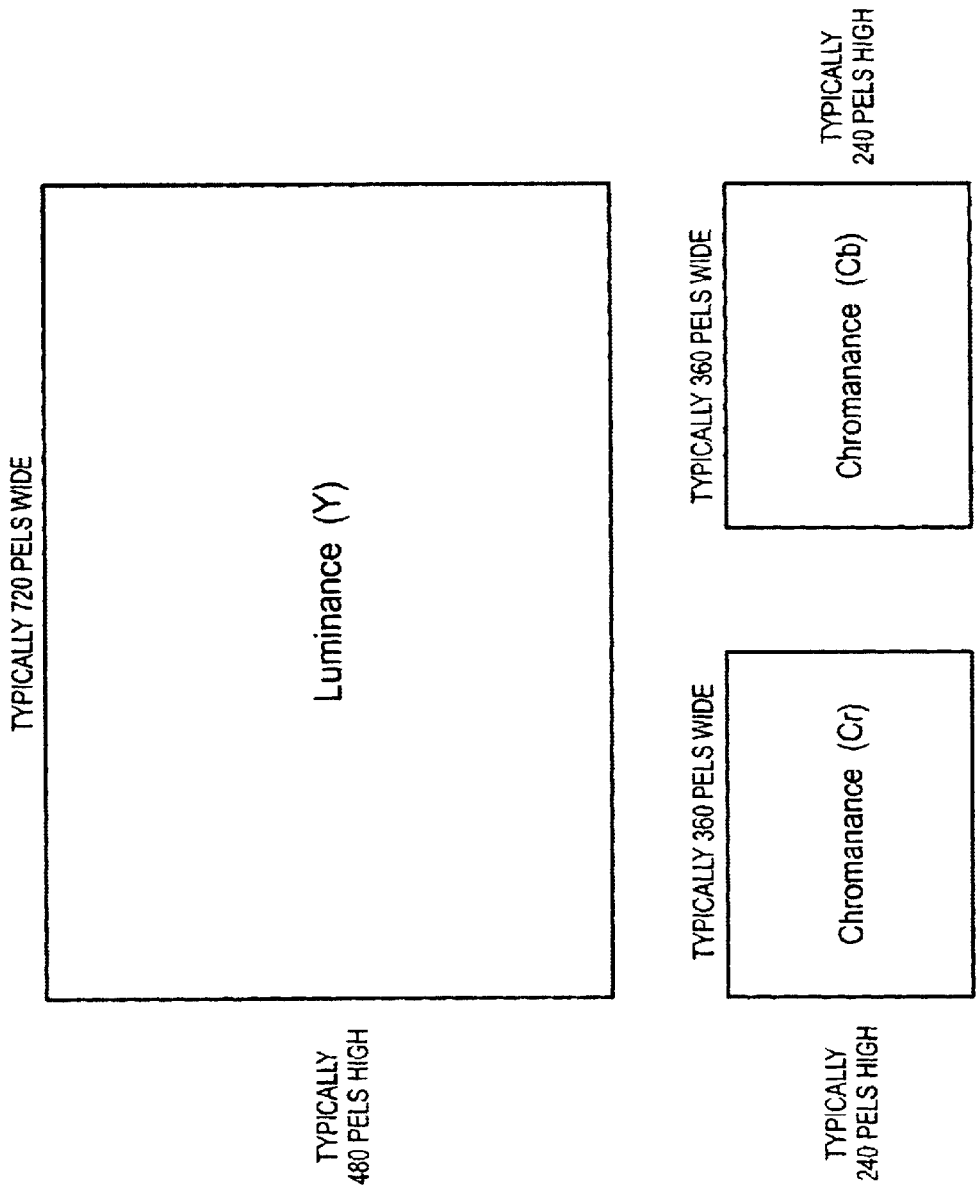
FIG. 5 illustrates one embodiment of a conceptual representation of pixel data.

FIG. 5 illustrates a conceptual representation of pixel data suitable for use with the invention. Each macroblock has 256 bites of luminance (Y) data for the 256 pixels of the macroblock. The blue chromanance (U) and red chromanance (V) data for the pixels of the macroblock are communicated at ¼ resolution, or 64 bytes of U data and 64 byes of V data for the macroblock and filtering is used to blend pixel colors. Other pixel encoding schemes can also be used.

Figure 6:
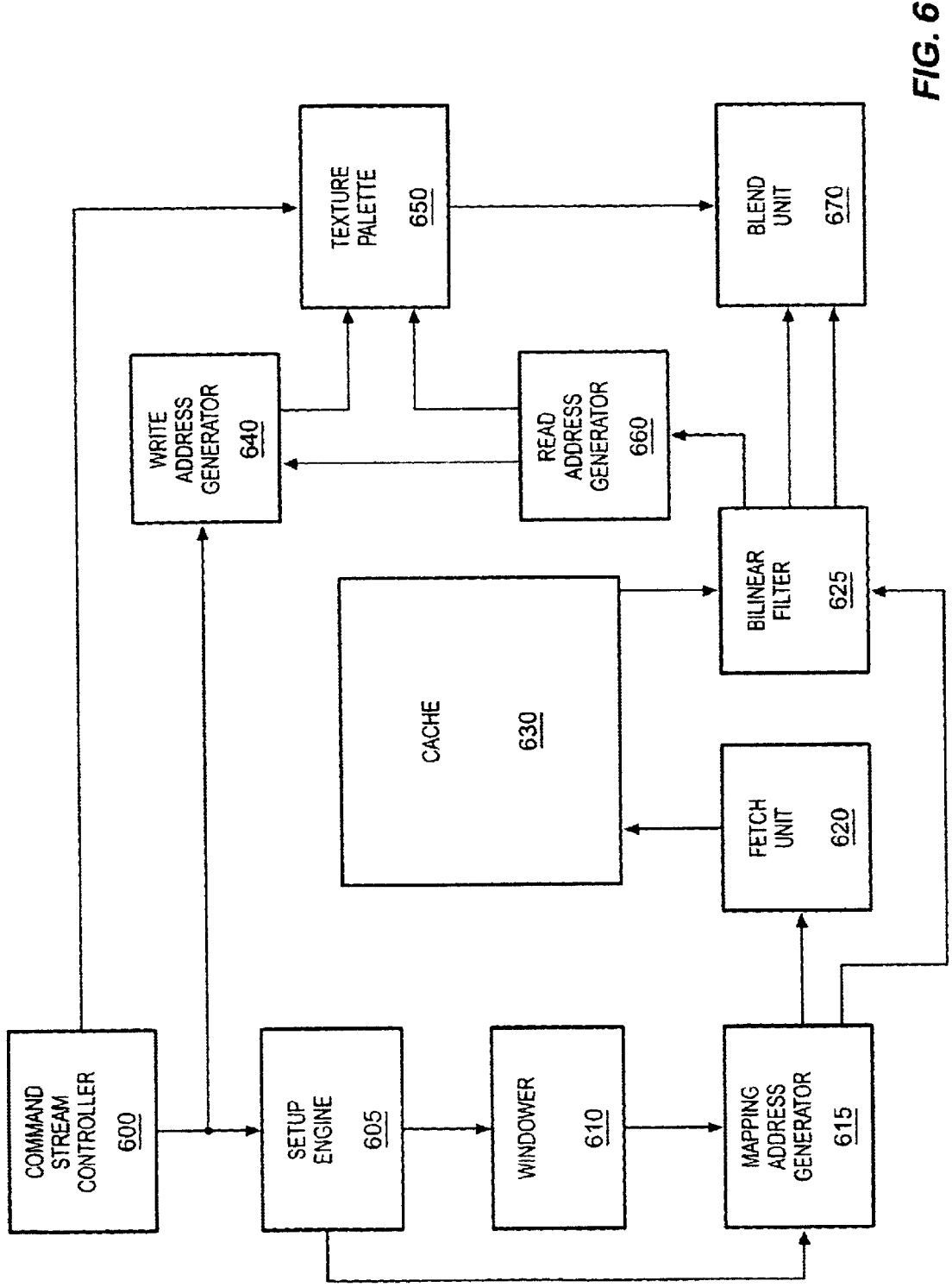
FIG. 6 is a block diagram of one embodiment of components for performing motion compensation and texture mapping.

FIG. 6 is a block diagram of one embodiment of components for performing motion compensation and texture mapping according to one embodiment of the invention. The components of FIG. 6 can be used to perform both texture mapping and motion compensation. In one embodiment, motion compensation decoding is performed in response to receiving a particular command referred to herein as the GFXBLOCK command; however, other command names and formats can also be used. One format for the GFXBLOCK command is described below in greater detail.

Command stream controller 600 is coupled to receive commands from an external source, for example, a processor or a buffer. Command stream controller 600 parses and decodes the commands to perform appropriate control functions. If the command received is not a GFXBLOCK command, command stream controller 600 passes control signals and data to setup engine 605. Command stream controller 600 also controls memory management, state variable management, two-dimensional operations, etc. for non-GFXBLOCK commands.

In one embodiment, when command stream controller receives a GFXBLOCK command, correction data is forwarded to and stored in texture palette 650; however, correction data can be stored in any memory. Command stream controller 600 also sends control information to write address generator 640. The control information sent to write address generator 640 includes block pattern bits, prediction type (e.g., I, B or P), etc. Write address generator 640 causes the correction data for pixels of a macroblock to be written into texture palette 650 in an order as output by an IDCT operation for the macroblock. In one embodiment the IDCT operation is performed in software; however, a hardware implementation can also be used.

Figure 7:
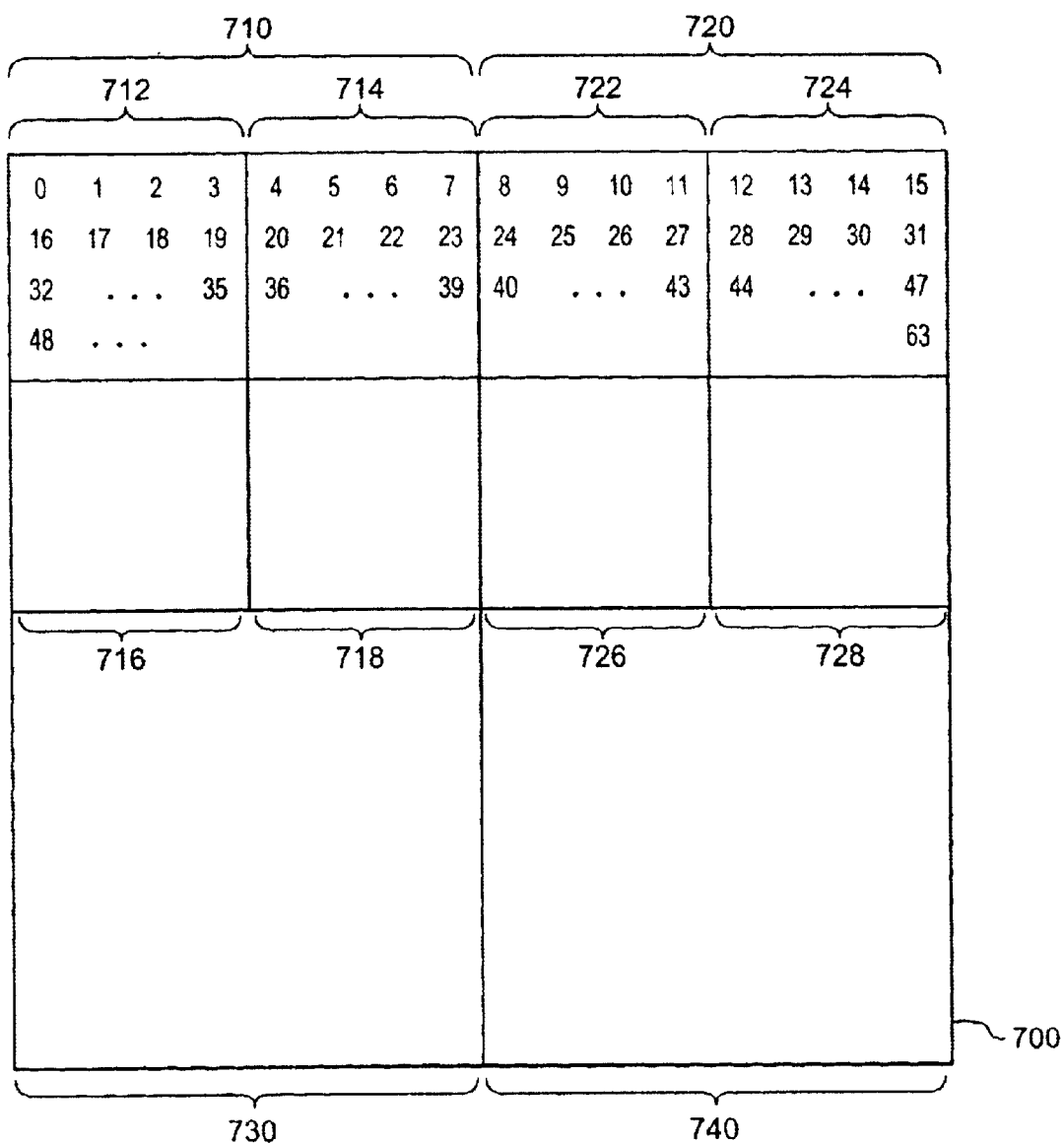
FIG. 7 illustrates one embodiment of luminance correction data for a 16 pixel by 16 pixel macroblock.

FIG. 7 illustrates luminance correction data for a 16 pixel by 16 pixel macroblock. Generally, macroblock 700 includes four 8 pixel by 8 pixel blocks labeled 710, 720, 730 and 740. Each block includes four 4 pixel by 4 pixel sub-blocks. For example, block 710 includes sub-blocks 712, 714, 716 and 718 and block 720 includes sub-blocks 722, 724, 726 and 728.

Write address generator 640 causes correction data for the pixels of a macroblock to be written to texture palette 650 block by block in row major order. In other words, the first row of block 710 (pixels 0–7) is written to texture palette 650 followed by the second row of block 710 (pixels 16–23). The remaining rows of block 710 are written to texture palette 650 in a similar manner.

After the data from block 710 is written to texture palette 650, data from block 720 is written to texture palette 650 in a similar manner. Thus, the first row of block 720 (pixels 8–15) are written to texture palette 650 followed by the second row of block 720 (pixels 24–31). The remaining rows of block 720 are written to texture palette 650 in a similar manner. Blocks 730 and 740 are written to texture palette 650 in a similar manner.

Referring back to FIG. 6, command stream controller 600 also sends control information to setup engine 605. In one embodiment, command stream controller 600 provides setup engine 605 with co-ordinates for the origin of the macroblock corresponding to the GFXBLOCK command being processed. For example, the coordinates (0,0) are provided for the top left macroblock of a frame, or the co-ordinates (0,16) are provided for the second macroblock of the top row of a frame.

Command stream controller 600 also provides setup engine 605 with height and width information related to the macroblock. From the information provided, setup engine 605 determines a bounding box that is contained within a predetermined triangle in the macroblock. In contrast, when texture mapping is being performed, setup engine 605 determines a bounding box that contains the triangle. Thus, when motion compensation is being performed, the entire macroblock is iterated rather than only the triangle.

In one embodiment, the bounding box is defined by the upper left and lower right corners of the bounding box. The upper left of the bounding box is the origin of the macroblock included in the GFXBLOCK command. The lower right corner of the bounding box is computer by adding the region height and width to the origin.

In one embodiment, the bounding box computes a texture address offset, $P_0$, which is determined according to:

$$P_{0u} = Origin_x + MV_x \qquad \text{(Equation 1)}$$

and $$P_{0v} = Origin_y + MV_y \qquad \text{(Equation 2)}$$

where $P_{0v}$ and $P_{0u}$ are offsets for v and u co-ordinates, respectively. $Origin_x$ and $Origin_y$ are the x and y co-ordinates of the bounding box origin, respectively, and $MV_x$ and $MV_y$ are the x and y components of the motion vector, respectively. The $P_0$ term translates the texture addresses in a linear fashion.

In one embodiment $P_{0v}$ and $P_{0u}$ are computed vectorially by summing the motion vectors with the region origin according to:

$$u(x, y) = \frac{C_{xS} \cdot x + C_{yX} \cdot y + C_{0S}}{C_{xiW} \cdot x + C_{yiW} \cdot C_{0iW}} + P_{0u} \quad \text{(Equation 3)}$$

and $$v(x, y) = \frac{C_{xT} \cdot x + C_{yT} \cdot y + C_{0T}}{C_{xiW} \cdot x + C_{yiW} \cdot y + C_{0iW}} + P_{0v} \quad \text{(Equation 4)}$$

where the variables in Equations 3 and 4 are as described below. In one embodiment, the values below are used for GFXBLOCK commands. For non-GFXBLOCK commands the values are calculated by setup engine 605. By using the values below, complex texture mapping equations can be simplified for use for motion compensation calculations, thereby allowing hardware to be used for both purposes.

| Variable | Description | Value |
| --- | --- | --- |
| $C_{xS}$ | Rate of change of S with respect to x | 1.0 |
| $C_{0S}$ | Offset to S | 0.0 |
| $C_{yS}$ | Rate of change of S with respect to y | 0.0 |
| $C_{xT}$ | Rate of change of T with respect to x | 0.0 |
| $C_{0S}$ | Offset to T | 0.0 |
| $C_{yT}$ | Rate of change of T with respect to y | 1.0 |
| $C_{xiW}$ | Rate of change of 1/W with respect to x | 0.0 |
| $C_{0iW}$ | Offset to 1/W | 1.0 |
| $C_{yiW}$ | Rate of change of 1/W with respect to y | 0.0 |

The u, v texture addresses are used to determine which pixels are fetched from reference pixels.

Mapping address generator 615 provides read addresses to fetch unit 620. The read address generated by mapping address generator 615 and provided to fetch unit 620 are based on pixel movement between frames as described by the motion vector. This allows pixels stored in memory to be reused for a subsequent frame by rearranging the addresses of the pixels fetched. In one embodiment, the addresses generated by mapping address generator 615 using the values listed above simplify to:

$$v(x, y) = y + P_{0v} \quad \text{(Equation 5)}$$

and $$u(x, y) = x + P_{0u} \quad \text{(Equation 6)}$$

Setup engine 605 provides the bounding box information to windower 610. Windower 610 iterates the pixels within the bounding box to generate write address for data written by the GFXBLOCK command. In other words, the triangle edge equations are always passed, which allows windower 610 to process the entire macroblock rather than stopping at a triangle boundary.

Windower 616 generates pixel write addresses to write data to a cache memory not shown in FIG. 6. Windower 610 also provides mapping address generator 615 with the origin of the macroblock and motion vector information is provided to mapping address generator 615. In one embodiment, windower 610 provides a steering command and a pixel mask to mapping address generator 615, which determines reference pixel locations based on the information provided by windower 610 and setup engine 605.

Fetch unit 620 converts the read addresses provided by mapping address generator 615 to cache addresses. The cache addresses generated by fetch unit 620 are sent to cache 630. The pixel data stored at the cache address is sent to bilinear filter 625. Mapping address generator 615 sends fractional-pixel positioning data and cache addresses for neighboring pixels to bilinear filter 615. If the motion vector defines a movement that is less than a full pixel, bilinear filter 625 filters the pixel data returned from cache 630 based on the fractional position data and the neighboring pixels. Bilinear filtering techniques are well known in the art and not discussed further herein.

In one embodiment, bilinear filter 625 generates both forward and backward filtered pixel information that is sent to blend unit 670. This information can be sent to blend unit 670 using separate channels as shown in FIG. 6, or the information can be time multiplexed over a single channel. Bilinear filter 625 sends pixel location information to read address generator 660. The pixel location information is positioning and filtering as described above.

Read address generator 660 causes pixel information to be read from texture palette 650 in an order different than written as controlled by write address generator 640. Referring to FIG. 7, read address generator 660 causes pixel data to be read from texture palette 650 sub-block-by-sub-block in row major order. This ordering optimizes performance of cache 630 due to locality of reference of pixels stored therein. In other words, the first row of sub-block 712 (pixels 0–3) are read followed by the second row of sub-block 712 (pixels 16–19). The remaining pixels of sub-block 712 are read in a similar manner.

After the pixels of sub-block 712 are read the pixels of sub-block 714 are read in a similar manner. The first row of sub-block 714 (pixels 4–7) are read followed by the second row of sub-block 714 (pixels 20–23). The remaining sub-blocks of block 710 (716 and 718) are read in a similar manner. The sub-blocks of block 720 are read in a similar manner followed by the sub-blocks of block 730 and finally by the sub-blocks of block 740.

The pixels read from texture palette 650 are input to blend unit 670. Blend unit 670 combines the pixel data from bilinear filter 625 with correction data from texture palette to generate an output pixel for a new video frame. Mapping address generator 615 provides fractional pixel positioning information to bilinear filter 625.

Multiple GFXBLOCK commands can exist in the pipeline of FIG. 6 simultaneously. As a result correction data steams through texture palette 650. Read and write accesses to texture palette 650 are managed such that the correction data steams do not overwrite valid data stored in the texture palette 650.

In one embodiment, a FIFO buffer (not shown in FIG. 6) is provided between mapping address generator 615 and bilinear filter 625. Because memory accesses are slower than other hardware operations, accesses to memory storing reference pixels can stall pipelined operations. The FIFO buffer allows memory latency to be hidden, which allows the pipeline to function without waiting for reference pixels to be returned from the memory, thereby improving pipeline performance.

In order to concurrently hide memory latency and store correction data in texture palette 650 for subsequent GFXBLOCK commands, write address generator 640 is prevented from overwriting valid data in texture palette 650. In one embodiment, read address generator 660 communicates synch points to write address generator 640. The synch points correspond to addresses beyond which read access generator 660 will not access. Similarly, write address generator 640 communicates synch points to read address generator 660 to indicate valid data.

Figure 8:
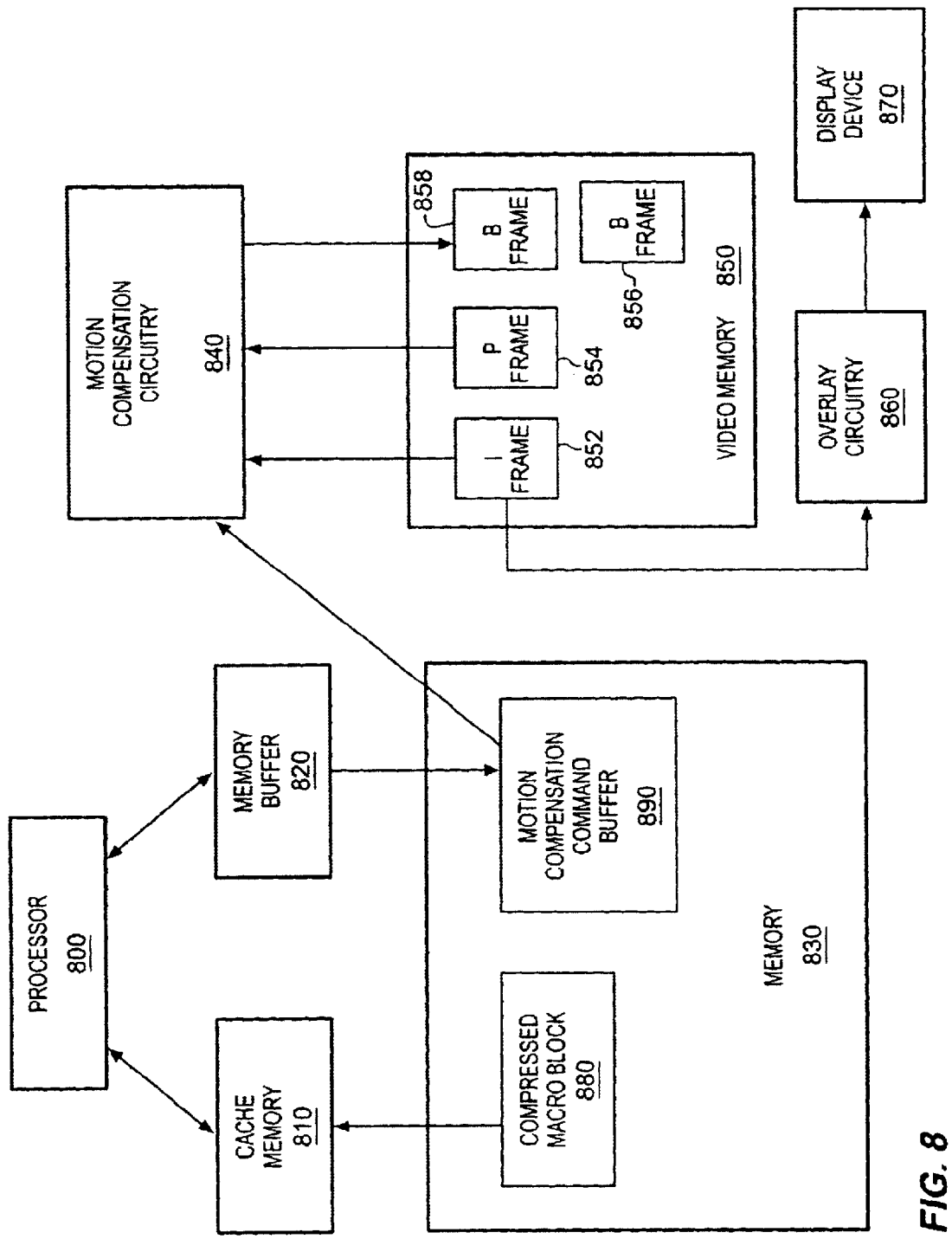
FIG. 8 is a block diagram of one embodiment of a hardware-software interface for motion compensation decoding according to one embodiment of the invention.

FIG. 8 is a block diagram of a hardware-software interface for motion compensation decoding according to one embodiment of the invention. The block diagram of FIG. 8 corresponds to a time at which the motion compensation circuitry is rendering a B frame and an I frame is being displayed. Certain input and/or output frames may differ as a video stream is processed.

Compressed macroblock 880 is stored in memory 830. In one embodiment, memory 830 is included within a computer system, or other electronic device. Compressed macroblock 880 can also be obtained from sources such as, for example, a CD-ROM, DVD player, etc.

In one embodiment, compressed macroblock 880 is stored in cache memory 810. Storing compressed macroblock 880 in cache memory 810 gives processor 800 faster access to the data in compressed macroblock 880. In alternative embodiments, compressed macroblock 880 is accessed by processor 800 in memory 830.

Processor 800 processes macroblock data stored in cache memory 810 to parse and interpret macroblock commands. In one embodiment, processor 800 also executes a sequence of instructions to perform one or more IDCT operations on macroblock data stored in cache memory 810. Processor 800 stores the results of the IDCT operations and command data in memory buffer 820. Memory buffer 820 stages data to be stored in memory 830.

Data from memory buffer 820 is stored in motion compensation command buffer 890. In one embodiment, motion compensation command buffer 890 is a FIFO queue that stores motion compensation commands, such as the GFXBLOCK command prior to processing by motion compensation circuitry 840. Motion compensation circuitry 840 operates on motion compensation commands as described above with respect to FIG. 6.

In the example of FIG. 8, motion compensation circuitry 840 reconstructs B frame 858 from I frame 852 and P frame 854. In one embodiment, the various frames are stored in video memory 850. Alternatively, the frames can be stored in memory 830 or some other memory. If, for example, motion compensation circuitry 840 were rendering a B frame a single frame would be read from video memory 850 for reconstruction purposes. In the example of FIG. 8, four frames are stored in video memory 850; however, any number of frames can be stored in video memory 850.

The frame being displayed (I frame 852) is read from video memory 850 by overlay circuitry 860. Overlay circuitry 860 converts YUV encoded frames to red-green-blue (RGB) encoded frames so that the frames can be displayed by display device 870. Overlay circuitry 860 can convert the displayed frames to other formats if necessary.

According to one embodiment, the GFXBLOCK command is a variable length command that may contain intra-coded correction at the end of the command. The GFXBLOCK command is a result of the translation of various types of coded macroblock of video data into a common denominator command. The translation is made by converting a single video macroblock into either three or six GFXBLOCK commands. According to one embodiment, the cases in which six GFXBLOCKs are required include when a video picture structure is a frame type and the video motion type is a field type, the video picture structure is a frame type and the video motion type is a dual prime motion vector type and the video picture structure is not is a frame type and the video motion type is 16×8. If none of the above criteria are met, then three GFXBLOCKs will be required. In the case where three GFXBLOCK commands are required, there shall be one command each for luminance (Y), one blue chromanance (U) and red chromanance (V). In the case where six GFXBLOCK commands are required, there shall be two commands each for luminance (Y), one blue chromanance (U) and red chromanance (V).

There are seven different methods by which an MPEG macroblock is converted to a series of GFXBLOCK commands. These "coding" types are quantified in the following table 1. The coding types (I, II, . . . VII) shown in Table 1 will be used below to describe the specifics of how a macroblock is converted into GFXBLOCK commands.

TABLE 1

Data Coding Types

| Coding Type | Does the video macroblock type have the INTRA bit set? | Value of video DCT type | Is the video motion type 16x8 and the video picture structure not a frame type? | Number of GFXBLOCK commands required |
|---|---|---|---|---|
| I | yes | 0 | no | 3 |
| II | yes | 1 | no | 3 |
| III | no | 0 | no | 3 |
| IV | no | 1 | no | 3 |
| V | no | 0 | no | 6 |
| VI | no | 1 | no | 6 |
| VII | no | 0 | yes | 6 |

According to one embodiment, the format of the GFXBLOCK command includes five or more, thirty-two bit data word. The first data word includes information containing block type, block pattern format, Y block pattern, Cr block pattern, Cb block pattern, horizontal motion vector precision, vertical motion vector precision, destination picture structure, forward reference picture structure and backward reference picture structure, as shown in Table 2 below.

TABLE 2

GFXBLOCK WORD 1

| DWord | Bits | Description |
|---|---|---|
| 1 | 31:30 | Block Type:<br>00 - Reserved<br>01 - Luminance (Y) Block<br>10 - Chromanance Red (Cr) Block<br>11 - Chromanance Blue (Cb) Block |
| | 29:28 | Block Pattern Format:<br>00 - Disable Block Pattern Usage and Intra-code/Correction data.<br>01 - Single Block.<br>10 - Halves: Left and Right.<br>11 - Quadrants. |
| | 27:24 | Y Block Pattern: Enable/disable correction data for the Y block(s) |
| | 23 | Cr Block Pattern: Enable/disable intra-coded/correction data for the Cr block |
| | 22 | Cb Block Pattern: Enable/disable intra-coded/correction data for the Cb block |
| | 21:18 | Reserved: 00h |
| | 17:16 | Horizontal Motion Vector Precision:<br>00 - ½ pixel<br>01 - ¼ pixel<br>10 - ⅛ pixel<br>11 - Reserved |
| | 15:14 | Vertical Motion Vector Precision:<br>00 - ½ pixel<br>01 - ¼ pixel<br>10 - ⅛ pixel<br>11 - Reserved |
| | 13:12 | Prediction Type:<br>00 - Intra-coded.<br>01 - Forward prediction<br>10 - Backward<br>11 - Bi-directional Prediction |

TABLE 2-continued

GFXBLOCK WORD 1

| DWord | Bits | Description |
|---|---|---|
| | 11:8 | Reserved: 00h |
| | 7:6 | Destination Picture Structure: |
| | | 00 - Frame |
| | | 01 - Reserved |
| | | 10 - Top Field |
| | | 11 - Bottom Field |
| | 5 | Reserved: 00h |
| | 4:3 | Forward Reference Picture Structure: |
| | | 00 - Frame |
| | | 01 - Reserved |
| | | 10 - Top Field |
| | | 11 - Bottom Field |
| | 2 | Reserved: 00h |
| | 1:0 | Backward Reference Picture Structure: |
| | | 00 - Frame |
| | | 01 - Reserved |
| | | 10 - Top Field |
| | | 11 - Bottom Field |

Block Type

According to one embodiment, bit 31–30 of the first data word include information corresponding to macroblock type. The block type refers to the type of macroblock (e.g., luminance, chromanance red or chromanance blue block) the received video data encompasses. A 01 received at bits 31–30 indicates that the macroblock is a luminance block, while a 10 or 11 at bits 31–30 indicates that the macroblock is a chromanance red block or chromanance blue block, respectively. Nevertheless, one of ordinary skill in the art will appreciate that the coding of the bits may be changed without altering the scope of the invention.

Block Pattern Format

According to one embodiment, bits 29–28 include information corresponding to the macroblock pattern format. A 00 at bits 29–28 of the GFXBLOCK interface indicates that block pattern usage has been disabled. Therefore, the height and width of the macroblock are not constrained and need only be less than 1024. Moreover, intra-coded/correction data is not allowed in this state. A 01 received at bits 29–28 indicates a single block format. As a result, subsequent bit 27 is used for a luminance block and bits 23,22 for the chromanance blocks, respectively. If intra-coded/correction data is present, the order of the data is row-major for the entire width of the block.

A 10 received at bits 29–28 indicates that the macroblock format is in top and bottom halves. This format occurs when the video motion type equals 2 and the video picture structure does not equal 3. According to one embodiment, subsequent bits 27–26 are used for the two halves of the Luminance block. Intra-coded/correction data is delivered in row-major order for the top half of the block, followed by the data for the bottom half of the block. Chromanance blocks are always considered to be single blocks, using bits 23 and 22, respectively, for the Cr and Cb blocks.

A 11 received at bits 29–28 indicates that the macroblock format is in upper-left, upper-right, lower-left, lower-right quadrants. According to one embodiment, bits 27–24 are used for the four quadrants of the luminance block respective. Intra-coded/correction data is delivered in row-major order for the four quadrants of the block beginning with the upper-left quadrant and proceeding to the upper-right, lower-left and lower-right quadrants. As described above, chromanance blocks are always considered to be single blocks, using bits 23 and 22 for the Cr and Cb blocks respectively. One of ordinary skill in the art will appreciate that the coding of the bits may be changed without altering the scope of the invention.

According to one embodiment, a macroblock includes six 8×8 blocks (e.g., four Y's, one U, and one V). A video stream may contain a coded block pattern (CBP). The CBP indicates which blocks are actually coded. The blocks which are not coded may be considered to contain data consisting entirely of zeros. In a further embodiment, a 4:2:0 CBP contains six bits, one for each of the blocks. If a bit in the CBP is set, data for the corresponding block is encoded in the stream.

In addition, GFXBLOCK commands may use this same mechanism to avoid sending down blocks containing all zeros. In one embodiment, the fields that control this mechanism are Block Pattern Format and Block Pattern. Y GFXBLOCK commands may have the Block Pattern Format set to "quarters" (3), while U and V GFXBLOCK commands may have Block Pattern Format set to "whole" (1).

Y, Cr and Cb Block Patterns

According to one embodiment, bits 27:24 indicate whether correction data is included for each quadrant of the Y block pattern. For example, a one received at any of the bits in the quadrants block pattern indicates that correction data is available for the respective quadrant. Bits 23 and 22 indicate whether correction data is included for the Cr and Cb block patterns, respectively. A one received at either of the bits indicates that correction data is available for the respective block pattern. Typically, the Block Pattern field contains bits for Y, U, and V blocks. Only the appropriate bits are used for each block. In other words, chip set 120 only uses the Y bits for Y blocks, U bits for U blocks and V bits for V blocks. One of ordinary skill in the art will appreciate that the coding of the bits may be changed without altering the scope of the invention.

Further, for blue chromanance and red chromanance GFXBLOCK commands, the Block Pattern is set to the MPEG coded block pattern. However, for the luminance (Y) GFXBLOCK commands, how the MPEG coded block pattern is converted to the Block Pattern bits in GFXBLOCK commands depends upon the Coding Type (I, II , . . . VII) discussed above.

For Coding Types I and III, the luminance GFXBLOCK command's Block 10 Pattern bits are set to the MPEG coded block pattern. For Coding Types II and IV, the GFXBLOCK command's block pattern bits are set to the MPEG coded block pattern logically OR'd with itself shifted two bits to the right then logically OR'd with the upper two bits of itself shifted two bits to the left. For Coding Type V (which requires a total of six GFXBLOCK commands), the Block Pattern for both of the luminance GFXBLOCK commands is set to the MPEG coded block pattern.

For Coding Type VI, Block Pattern for the first luminance GFXBLOCK command needs to be set to bits 4–5 of the coded block pattern logically OR'd with bits 4–5 of the coded block pattern shifted two bits to the right. For Coding Type VI, Block Pattern for the second luminance GFXBLOCK command needs to be set to bits 2–3 of the coded block pattern logically OR'd with bits 2–3 of the coded block pattern shifted two bits to the left.

For Coding Type VII, Block Pattern for the first luminance GFXBLOCK command needs to be set to bits 4–5 of coded block pattern. For Coding Type VII, Block Pattern for the second luminance GFXBLOCK command needs to be set to bits 2–3 of the coded block pattern shifted two bits to the left.

Motion Vector Precision

According to one embodiment, bits 17–16 indicate the motion vector precision for the horizontal component of the macroblock, while bits 15–14 indicate the vertical component. A received 00 at either bits 17–16 or bits 15–14 indicates ½ pixel precision, 01 indicates ¼ pixel precision and 10 indicates ⅛ pixel precision. According to another embodiment, ¼ pixel precision for either the horizontal or vertical component is used for 2:1 down sampling, and ⅛ pixel precision is used for 4:1 down sampling. One of ordinary skill in the art will appreciate that the coding of the bits may be changed without altering the scope of the invention.

Prediction Type

Bits 13–12 indicate the prediction type of the macroblock. According to one embodiment, the Prediction Type is determined by the macroblock picture_coding type. The four picture$_{13}$ coding types include the intra-coded, pattern, motion backward and motion forward. A 00 at bits 13–12 indicates an intra-coded prediction type. In the intra-coded prediction type, the motion vector fields are ignored. A 01 at bits 13–12 indicates a forward prediction type wherein only the forward motion vector is used. A 10 indicates a backward prediction type wherein only the backward motion vector is used. A 11 at bits 13–12 indicates a bi-directional prediction type. In the bi-directional prediction type, both the forward and backward motion vectors are used. One of ordinary skill in the art will appreciate that the coding of the bits may be changed without altering the scope of the invention.

Destination Picture Structure

According to one embodiment, bits 7–6 indicate the destination picture structure for the macroblock. The destination picture structure specifies the structure of the destination surface for predicting the macroblock. In one embodiment, the overall structure of the picture may be different, as in field/frame prediction. The destination picture structure matches the video picture structure from the stream. However, when the macroblock is broken into two sets of GFXBLOCK commands, the destination picture structure for the second set of GFXBLOCK commands may refer to the opposite field from the first set. For example, if the destination picture structure for the first set is the top-field picture structure, then the destination picture structure for the second set of GFXBLOCK commands may be the bottom-field picture structure.

If three GFXBLOCK commands are needed to code the macroblock and the picture_structure is a frame type, then the Destination Picture Structure bits are set to 00. A received 00 at bits 7–6 indicates a frame picture structure wherein the vertical stride is 1 line. If three GFXBLOCK commands are needed to code the macroblock and the picture_structure is a top field type, then the Destination Picture Structure bits are set to 10. A received 10 indicates a top field picture structure wherein the vertical stride is 2 lines and the offset is zero lines.

If three GFXBLOCK commands are needed to code the MPEG macroblock, and the picture_structure is a bottom field type then the Destination Picture Structure bits are set to 11. A received 11 indicates a bottom field picture structure wherein the vertical stride is again 2 lines and the offset is 1 line. If six GFXBLOCK commands are needed to code the macroblock, and 16×8 motion is not indicated, the Destination Picture Structure bits are set to 10 for the first set of GFXBLOCK commands, while the Destination Picture Structure bits are set to 11.

If 16×8 motion is indicated and the picture_structure is the bottom field type, then the Destination Picture Structure bits of all six GFXBLOCK commands are set to 11. If 16×8 motion is indicated and the picture_structure is the top field type, the Destination Picture Structure bits of all six GFX-BLOCK commands are set to 10. One of ordinary skill in the art will appreciate that the coding of the bits may be changed without altering the scope of the invention.

Reference Picture Structure

Bits 4–3 indicate forward reference picture structure of the macroblock and bits 1–0 indicate the backward reference picture structure. Both the forward and backward reference picture structure fields override the vertical line stride and offset. The reference picture structure matches the video motion vector field select attribute for both forward and back references. However in the case of dual prime motion, the forward reference picture structure may match the current destination picture structure and the back reference picture structure may refer to the opposite field.

According to one embodiment, if the picture_structure is a frame type and the motion_type is frame, the GFX-BLOCK commands Forward and Backward Reference Picture Structure bits are set to 00. A 00 at either bits 4–3 or bits 1–0 indicates a frame reference picture structure wherein the vertical stride is 1 line. In the case where the picture_structure is the frame type and the motion_type is a field type, or the picture_structure is not the frame type and the motion_type is 16×8, the following occurs.

First, if motion_vertical_field_select is the first stream of the forward motion vector, the Forward Reference Picture Structure bits of the first set of GFXBLOCK commands are set to 11 (bottom field). Otherwise, the Forward Reference Picture Structure bits are set to 10 (top field). Second, if motion_$_{vertical}$_field_select is the first stream of the backward motion vector, the Backward Reference Picture Structure bits of the first set of GFXBLOCK commands are set to 11 (bottom field). Otherwise, the Backward Reference Picture Structure bits are set to 10 (top field).

Third, if motion_vertical_field_select is the second stream of the forward motion vector, the Forward Reference Picture Structure bits of the second set of GFXBLOCK commands are set to 11 (bottom field). Otherwise, the Forward Reference Picture Structure bits are set to 10 (top field). Finally, if MPEG motion_vertical_field_select is the second stream of the backward motion vector, the Backward Reference Picture Structure bits of the second set of GFXBLOCK commands are set to 11 (bottom field). Otherwise, the Backward Reference Picture Structure bits are set to 10 (top field).

In the case where the picture_structure is not the frame type and the motion_type is field type the following occurs. First, if motion_vertical_field_select is the first stream of the forward motion vector, the Forward Reference Picture Structure bits of the first set of GFXBLOCK commands are set to 11 (bottom field). Otherwise, the Forward Reference Picture Structure bits are set to 10 (top field). Second, if motion_vertical_field_select is the first stream of the backward motion vector, the Backward Reference Picture Structure bits of the first set of GFXBLOCK commands are set to 11 (bottom field). Otherwise, the Backward Reference Picture Structure bits are set to 10 (top field).

In the case where the picture_structure is a frame type and the motion_type is a dual prime type, the Forward Reference Picture Structure of the first set of GFXBLOCK commands and the Backward Reference Picture Structure from the second set of GFXBLOCK commands are set to 10 (top field). The Backward Reference Picture Structure of the first set of GFXBLOCK commands and the Forward Reference Picture Structure from the second set of GFXBLOCK commands are set to 11 (bottom field).

In the case where the picture_structure is not the frame type and the motion_type is the dual prime type, the following occurs. First, if the picture_structure is a top field type, the Forward Reference Picture Structure bits are set to 10 (top field) and the Backward Reference Picture Structure bits are set to 11 (bottom field). Second, if the picture_structure is the bottom field type, the Forward Reference Picture Structure bits are set to 11 (bottom field) and the Backward Reference Picture Structure bits are set to 10 (top field).

DATA WORD TWO

The second data word includes information containing the horizontal and vertical origin of the macroblock, as shown in Table 3 below that is eventually forwarded to set up engine 605.

TABLE 3

GFXBLOCK WORD 2

| Word | Bits | Description |
|---|---|---|
| 2 | 31:26 | Reserved: 00h |
|  | 25:16 | Horizontal Origin: |
|  | 15:10 | Reserved: 00h |
|  | 9:0 | Vertical Origin: |

Horizontal and Vertical Origin

Bits 25–16 indicate the horizontal origin of the macroblock and bits 9–0 indicate the vertical origin. Typically, macroblocks are aligned on a 16×16 grid of pixels in the final picture (e.g., Ox and Oy). The Y block's origin is simply the display coordinates in the cases requiring three GFXBLOCK commands (Coding Types I, II, and III). In addition, for triple GFXBLOCK sets, the Y block's origin is simply Ox, Oy. For Coding Types IV, V, and VI, the vertical origin must be set to half of the vertical display coordinate. The horizontal origin is set to the unaltered horizontal display coordinate. For Coding Type VII (16×8 motion), half the block height is added to the vertical origin. In addition, the origins for U and V blocks are half of the Y blocks.

In one embodiment, the horizontal origin designated by bits 25–16 is an unsigned integer specifying both the upper-left pixel of the destination macroblock and the origin of the motion vectors in the reference frame(s). This value is typically a multiple of the width, with a valid range of 0–1023. Similarly, the vertical origin designated by bits 9–0 is an unsigned integer specifying the upper-left pixel of the destination macroblock and the origin of the motion vectors in the reference frame(s). This value is typically a multiple of the height, with a valid range of 0–1023. One of ordinary skill in the art will appreciate that the coding of the bits may be changed without altering the scope of the invention.

DATA WORD THREE

The third data word includes information regarding the height and width of the macroblock, as shown in Table 4 below forwarded to set up engine 605.

TABLE 4

GFXBLOCK WORD 3

| Word | Bits | Description | |
|---|---|---|---|
| 3 | 31:26 | Reserved: 00h | |
|  | 25:16 | Height: | |
|  |  | Disabled | Valid range: 1–1023 (used for skipped macroblocks) |
|  |  | Single | Valid values are 2,4,8 |
|  |  | Halves | Valid values are 2,4,8 |
|  |  | Quadrants | Valid values are 4,8,16 |
|  | 15:10 | Reserved: 00h | |
|  | 9:0 | Width: | |
|  |  | Disabled | Valid range: 1–1023 (used for skipped macroblocks) |
|  |  | Single | Valid values are 2,4,8 |
|  |  | Halves | Valid values are 4,8,16 |
|  |  | Quadrants | Valid values are 4,8,16 |

Height and Width

Bits 25–16 indicate the height of the macroblock and bits 9–0 indicate the width. According to one embodiment, the height and width indicate the number of data samples contained within the GFXBLOCK. For Coding Types I, II and III, the Height and Width bits of the Y GFXBLOCK commands are set to the macroblock size (i.e. 16×16). For Coding Types IV, V, VI, and VII, the Width is still set to the macroblock width, however the Height is set to half of the macroblock height. In addition, the Height and Width for U and V GFXBLOCK commands are half of the Height and Width from the corresponding Y GFXBLOCK commands.

If a set of 6 GFXBLOCK commands is required to describe the macroblock, the height should be halved. Further, the U and V height and widths are half the Y height and width. In one embodiment, the macroblock height, designated by bits 25–16, is an unsigned integer specifying the height of the destination block and the source block(s), if required. The valid values for this field are dependent on the block pattern format described above. If the block pattern format is disabled, the valid height range is 1–1023. For the single and halves block formats, the valid values are 2, 4 and 8. For the quadrants block format, the valid values are 4, 8 and 16.

In a further embodiment, the macroblock width, designated by bits 9–0, is an unsigned integer specifying the height of the destination block and the source block(s), if required. The valid values for this field are also dependent on the block pattern format. If the block pattern format is disabled, the valid width range is 1–1023. For the single and halves block formats, the valid values are 2, 4 and 8. For the quadrants block format, the valid values are 4, 8 and 16.

DATA WORDS FOUR AND FIVE

The fourth and fifth data words include information regarding the forward and backward motion vector, respectively, of the macroblock, as shown in Table 5 below.

TABLE 5

GFXBLOCK WORDS 4 AND 5

| DWord 4 and 5 | Bits 31:16 | Description Horizontal Motion Vector Value | | |
|---|---|---|---|---|
| | | Precision | Format | Range |
| | | ½ pixel | S14.1 | [−1024.0–1023.5] |
| | | ¼ pixel | S13.2 | [−1024.0–1023.75] |
| | | ⅛ pixel | S12.3 | [−1024.0–1023.875] |
| | 15:0 | Vertical Motion Vector Value | | |
| | | Precision | Format | Range |
| | | ½ pixel | S14.1 | [−1024.0–1023.5] |
| | | ¼ pixel | S13.2 | [−1024.0–1023.75] |
| | | ⅛ pixel | S12.3 | [−1024.0–1023.875] |

Forward and Backward Motion Vector Values

Bits 31–16 of word 4 indicate the forward horizontal motion vector value of the macroblock, while bits 15–0 indicate the forward vertical motion vector value. Similarly, bits 31–16 of word 5 indicate the backward horizontal motion vector value of the macroblock and bits 15–0 indicate the backward vertical motion vector value. The motion vectors may be copied from the video stream to the GFX-BLOCK commands. However, for frame-field motion, and dual-prime motion, the vertical motion vectors are halved as they are copied. Also, the vertical vectors are halved for the second set of GFXBLOCK commands in a 6 GFXBLOCK set for any non-16x8 motion type as they are copied. In addition, the U and V vectors need to be halved in both directions, rounding towards zero.

In one embodiment, the value for the horizontal and vertical motion vector values are in 2's complement fixed point format depending on the motion vector precision bits (e.g., ½ pixel, ¼ pixel and ⅛ pixel). For ½ pixel precision, the format is S14.1 with a range of −1024.0–1023.5. For ¼ pixel precision, the format is S13.2 with a range of −1024.0–1023.75. For ⅛ pixel precision, the format is S12.3 with a range of −1024.0–1023.875. The range defines the clamp boundaries for the values. One of ordinary skill in the art will appreciate that the coding of the bits may be changed without altering the scope of the invention.

DATA WORD SIX

Finally, the beginning of the sixth data word, if applicable, includes correction data. According to one embodiment, correction data is received only if bits 27–22 of data word one indicates that correction data is enabled. In another embodiment, each packet of 32 bit data received is block intra-coded/correction data that includes an 8-bit or 16-bit of data depending upon the prediction type. An intra-coded block includes four 8-bit values packed in the 32 bits wherein the least significant byte contains data for the left most pixel, spatially. A predicted block includes two 16-bit values packed in the 32 bits wherein the least significant word contains data for the left most pixel, spatially.

As described above, the GFXBLOCK command simplifies the interface to the motion compensation circuitry by translating the various types of motion vectors into a common denominator command. Using the Frame-Frame DCT0 [5.0, 7.5]MV(FWD only) motion vector as an example, the first 32-bit data word includes a 01 at bits 31–30 indicating a luminance block type. Also, bits 29–22 includes 11101000. Starting from the most significant bit, the 11 at bits 29–28 indicates a quadrants block pattern format, while the 1010 at bits 27–24 indicates that correction data is included for the Y0 and Y2 blocks. Since the block type is luminance, the 00 at bits 23–22 indicates that no correction data is included for the Cb and Cr blocks.

In addition, bits 17–14 include 0000. The 00 at bits 17–16 and the 00 at bits 15–14 indicate ½ pixel precision for the horizontal and vertical motion vectors, respectively. A 01 at bits 13–12 indicates a forward prediction wherein only the forward motion vector is used. Bits 7–6, bits 4–3 and bits 1–0 all include a 00. These bits all indicate a frame picture structure for the destination, forward reference and backward reference picture structures.

The second data word includes 0000010000 at bits 25–16 and 0000100000 at bits 9–0, which indicates that the macroblock has a horizontal origin at 16 and a vertical origin at 32. The third data word includes 0000010000 at bits 25–16 and 0000010000 at bits 9–0, which indicates quadrants 16 as the height and width of the destination blocks as determined by the block pattern format indicated above.

The fourth data word includes a 0000000000001010 at bits 31–16 and 0000000000001111 at bits 15–0. Bits 31–16 indicate that the horizontal motion vector value is 5, while the vertical motion vector value is 7.5. Since macroblock is a forward predicted type, the backward motion vector is unused. Therefore, the fifth data word includes all zeroes. The beginning of the sixth data word includes sixty-four 32-bit data words of correction data each for the Y0 and Y2 blocks.

Whereas many alterations and modifications of the present invention will no doubt become apparent to a person of ordinary skill in the art after having read the foregoing description, it is to be understood that any particular embodiment shown and described by way of illustration is in no way intended to be considered limiting.

Therefore, references to details of various embodiments are not intended to limit the scope of the claims which in themselves recite only those features regarded as the invention.

What is claimed is:

1. A method of motion compensation of digital video data comprising:
   receiving a first macroblock at a processor, the first macroblock corresponding with a first of a plurality of motion compensation coding types;
   translating the first macroblock into one or more motion compensation commands having associated correction data related to the first macroblock, wherein the motion compensation commands is an autonomous command that supports all of the plurality of motion compensation coding types;
   retrieving the one or more motion commands at motion compensation circuitry;
   performing frame prediction operations at the motion compensation circuitry;
   reading the correction data from a first memory; and
   combining the correction data with results from the frame prediction operations to generate an output video frame.

2. The method of claim 1 further comprising:
   receiving a second macroblock corresponding with a second of the plurality of motion compensation coding types; and
   translating the second macroblock into one or more motion compensation commands having associated correction data related to the second macroblock.

3. The method of claim 1 further comprising storing the correction data in a second memory after translating the first macroblock into the one or more motion compensation commands.

4. The method of claim 1 performing frame prediction operations further comprises:
   generating a bounding box containing the macroblock;
   iterating the bounding box;
   fetching reference pixels;
   filtering the reference pixels;
   averaging the filtered reference pixels, if necessary; and
   adding correction data to the reference pixels.

5. The method of claim 1 further comprising performing texturing operations for the macroblock.

6. A circuit comprising:
   a command stream controller to receive one or more motion compensation commands, each of the one or more motion compensation commands supporting a plurality of motion compensation code types;
   a write address generator coupled to the command stream controller;
   a memory coupled to the command stream controller and to the write address generator to store pixel data;
   processing circuitry coupled to the write address generator to receive control information and data from the command stream controller to generate a reconstructed video frame; and
   a read address generator coupled to the processing circuitry and to the memory.

7. The circuit of claim 6 wherein the memory stores the pixel data in a first order determined by the write address generator.

8. The circuit of claim 7 wherein the first order corresponds to an output sequence of an inverse discrete cosine transform operation.

9. The circuit of claim 6 wherein the read address generator causes the memory to output pixel data in a second order.

10. The circuit of claim 6 wherein the processing circuitry comprises a setup engine that determines a bounding box for pixels manipulated by the instruction, the bounding box including all edges of a macroblock.

11. The circuit of claim 6 wherein the processing circuitry comprises a windower having a first mode wherein pixels inside a triangle within a bounding box are processed, and a second mode wherein all pixels within the bounding box are processed.

12. The circuit of claim 7 wherein the first order is block-by-block row major order.

13. The circuit of claim 9 wherein the second order is sub-block-by-sub-block row major order.

14. A computer system comprising:
   a processor to translate a macroblock into one or more motion compensation commands having associated correction data related to the macroblock, each of the one or more motion compensation commands supporting a plurality of motion compensation code types;
   a main memory coupled to the processor to store macroblocks and the motion compensation commands; and
   motion picture circuitry coupled to the main memory to perform motion compensation functions on the compensation commands.

15. The computer system of claim 14 wherein the motion picture circuitry further performs texture mapping.

16. The computer system of claim 14 further comprising:
   a cache memory coupled to the processor and the main memory; and
   a memory buffer coupled to the processor and the main memory.

17. The computer system of claim 14 further comprising a video memory coupled to the motion picture circuitry.

18. The computer system of claim 17 wherein the video memory comprises:
   an I frame buffer;
   a P frame buffer; and
   a frame buffer.

19. The computer system of claim 18 wherein the motion picture circuitry reconstructs B frames from I and P frames.

20. The computer system of claim 17 further comprising:
   overlay circuitry coupled to the video memory; and
   a display device coupled to the overlay circuitry.

21. The computer system of claim 14 wherein the motion compensation circuitry comprises:
   a command stream controller to receive one or more motion compensation commands, each of the one or more motion compensation commands supporting a plurality of motion compensation code types;
   a write address generator coupled to the command stream controller;
   a texture palette coupled to the command stream controller and to the write address generator to store pixel data;
   processing circuitry coupled to the write address generator to receive control information and data from the command stream controller to generate a reconstructed video frame; and
   a read address generator coupled to the processing circuitry and to the texture palette.

22. The computer system of claim 21 wherein the texture palette stores the pixel data in a first order determined by the write address generator.

23. The computer system of claim 22 wherein the first order corresponds to an output sequence of an inverse discrete cosine transform operation.

24. The computer system of claim 21 wherein the read address generator causes the texture palette to output pixel data in a second order.

25. The computer system of claim 21 wherein the processing circuitry comprises a setup engine that determines a bounding box for pixels manipulated by the instruction, the bounding box including all edges of a macroblock.

26. The computer system of claim 21 wherein the processing circuitry comprises a windower having a first mode wherein pixels inside a triangle within a bounding box are processed, and a second mode wherein all pixels within the bounding box are processed.

* * * * *

UNITED STATES PATENT AND TRADEMARK OFFICE
CERTIFICATE OF CORRECTION

PATENT NO. : 6,707,853 B1  
DATED : March 16, 2004  
INVENTOR(S) : Cook et al.

It is certified that error appears in the above-identified patent and that said Letters Patent is hereby corrected as shown below:

Column 2,  
Line 66, delete "motion/compensation", insert -- motion compensation --.

Column 3,  
Line 30, after "Computer", insert -- system --.  
Line 59, after "computer", insert -- system --.  
Line 62, before "100", insert -- system --.

Column 5,  
Line 31, delete "bites", insert -- bytes --.

Column 7,  
Line 54, delete "616", insert -- 610 --.

Column 12,  
Line 49, after "Block", delete "10".

Signed and Sealed this

Fifteenth Day of June, 2004

JON W. DUDAS  
*Acting Director of the United States Patent and Trademark Office*